METHODS OF GROUTING OFFSHORE STRUCTURES

Original Filed Sept. 15, 1969

United States Patent Office

Re. 28,232
Reissued Nov. 5, 1974

28,232
METHODS OF GROUTING OFFSHORE STRUCTURES

Max Bassett, Houston, Tex., and Horace W. Olsen, deceased, late of Houston, Tex., by Magdalene M. Olsen, executrix, Houston, Tex., assignors to C. Nelson Shields, Jr., trustee Original No. 3,601,999, dated Aug. 31, 1971, Ser. No. 858,951, Sept. 18, 1969. Application for reissue July 11, 1973, Ser. No. 378,196
Int. Cl. E02b *17/00;* E02d *5/24*
U.S. Cl. 61—46 15 Claims

Matter enclosed in heavy brackets [ ] appears in the original patent but forms no part of this reissue specification; matter printed in italics indicates the additions made by reissue.

ABSTRACT OF THE DISCLOSURE

*A method for grouting the annulus between the jacket and piling in the legs of an offshore structure in which air is introduced to expel water from the lower end of the annulus, and the annulus is then filled from the top with grouting material. Air pressure may be maintained in the annulus sufficient to prevent ingress of water through the lower end of the jacket while grouting material is being introduced.*

[Compressed air is introduced into an annular space existing between the jacket and piling in the legs of an offshore structure so that water is expelled from the annular space through the lower end of the jacket and grouting material is then introduced into the annular space. The introduction of compressed air and grouting material is effected from above the waterline, thus avoiding the necessity of performing the grouting operation by divers at the sea bed.]

This invention relates to new and useful improvements in methods of grouting offshore structures used in the oil and gas industry. Such structures usually have supporting legs each conisting of a tubular jacket which extends downwardly from above the waterline to the seabed, and a piling which is driven through the jacket into the seabed. Some clearance necessarily exists, and this results in an annular space between the inside of the jacket and the piling, which space has to be filled with grouting material, particularly in the region of the lower end of the jacket, in order to attain rigidity sufficient for withstanding tides, ocean currents, and the like.

It has been common in the art for the grouting operation to be performed by divers working at the bottom of the structure on the seabed, and apart from the obvious difficulties inherently associated with working under water, the conventional method often failed to produce fully satisfactory results because water could not be effectively excluded from the space which the grouting material was intended to fill and the grouting material itself became diluted and difficult to set.

The principal object of the invention is to eliminate the above outlined disadvantages of conventional grouting procedures, this being attained by providing an improved grouting method which may be easily and conveniently practiced from above the waterline rather than by divers below, and which assures proper placement and setting of the grouting material by exclusion of water therefrom.

With the foregoing more important object and features in view and such other objects and features which may become apparent as this specification proceeds, the invention will be understood from the following description taken in conjunction with the accompanying drawings, wherein like characters of reference are used to designate like parts, and wherein.

Figure 1:
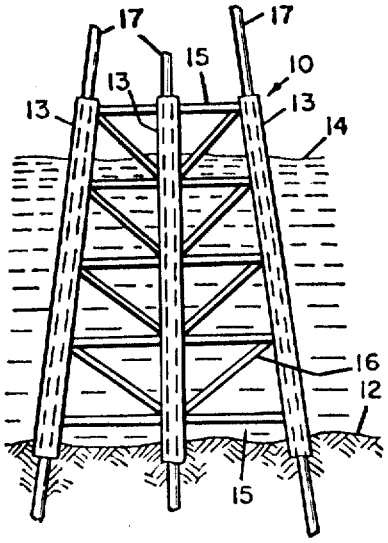
FIG. 1 is an elevational view showing a typical installation of an offshore structure on the sea bed.

Referring now to the accompanying drawings in detail, the general reference numeral 10 in FIG. 1 designates a typical offshore structure such as is used in the oil and gas industry for offshore drilling, the structure 10 as shown being only the base portion which is being installed on the seabed 12, prior to providing the base portion with the usual deck and other superstructure (not shown). The structure 10 includes a plurality of supporting legs, each in the form of a tubular jacket 13 which extends downwardly from above the waterline 14 to the seabed 12, the several leg jackets being secured together by cross-members 15 and diagonals 16 in the conventional manner.

Figure 2:
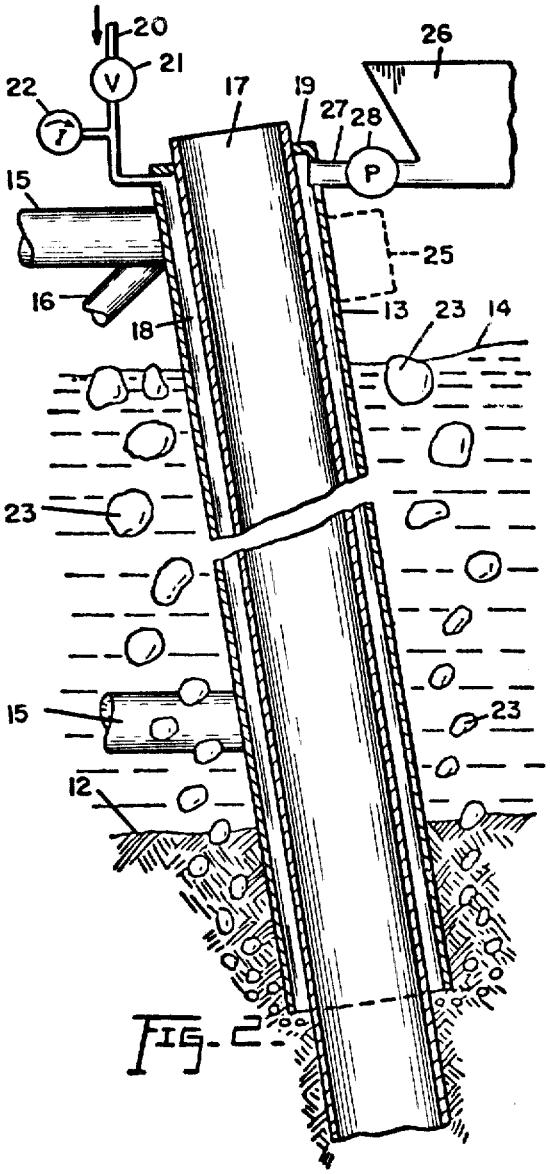
FIG. 2 is an enlarged, fragmentary vertical sectional view of one of the legs of the structure, showing the method step of expelling water from space between the jacket and piling of the leg.

Each leg also includes a tubular piling 17 which is driven through the jacket 13 into the seabed 12, and inasmuch as some clearance is necessary, an annular space 18 comes into being between the inside of the jacket 13 and the piling 17, as shown in FIG. 2. This annular space must be filled with grouting material, particularly in the region of the lower end of the jacket 13, not only in order to attain leg rigidity sufficient to withstand tides, ocean currents and the like, but also to protect the piling and the inside of the jacket against corrosion by sea water and air.

After the piling 17 has been driven through the jacket 13 into the seabed 12, the piling is cut off at the upper end of the jacket and the two components are secured together, as by a weld 19, prior to installation of the deck and other superstructure. The welding operation at 19 in effect constitutes the first step of the method of the invention, in that it seals or closes off the annular space 18 at the upper end of the jacket 13.

The second step of the method involves the introduction of compressed air into the annular space 18, as for example through a compressed air line 20 which is equipped with a suitable control valve 21 and a pressure gauge 22 and communicates with the annular space 18 at a point adjacent the upper end of the jacket 13, above the waterline 14. With the introduction of compressed air, any water in the annular chamber 18 is forced downwardly and outwardly through the lower end of the jacket 13 into the seabed 12, and when all water has been expelled from the space 18, bubbles of air will rise through the seabed and through the water above to the waterline 14, as indicated at 23, thus giving a visible indication that all water has been expelled from the space 18.

In the event that the seabed 12 is not sufficiently soft or muddy to permit the escape of water and air from the annular space 18 as above described, a suitable vibrator device 25 may be attached to the upper end portion of the jacket 13 above the waterline 14, so as to vibrate the jacket 13 and break its bond with the relatively firm seabed, sufficiently to facilitate expulsion of water and air from the space 18 as already explained.

In any event, when all the water has been expelled from the annular space 18, the compressed air supply through the line 20 is controlled by the valve 21 and monitored by the gauge 22 so as to produce a static air pressure in the space 18 sufficient to prevent ingress of sea water through the lower end of the jacket 13. While this condition prevails, suitable grouting material is introduced into the annular space 18, as for example from a hopper 26 through a conduit 27 under the action of a pump 28, the conduit 27 communicating with the annular space 18 at a point adjacent the upper end of the jacket 13, above the waterline 14.

Figure 3:
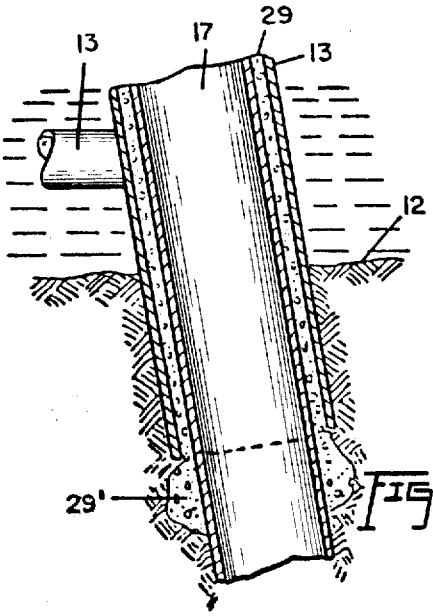
FIG. 3 is a fragmentary sectional view, similar to the lower portion of FIG. 2 and showing the grouting material in place.

The grouting material thus fills the annular space 18 as indicated at 29 in FIG. 3, and while grouting of the lower end portion of the space is most important, the entire length of the space may be grouted to above the waterline. If the seabed 12 is soft and muddy, some of the grouting material may flow out of the lower end of the jacket 13 as indicated at 29. In such event this initial fill of grout may be permitted to set, before grouting the rest of the annular space 18. In any event, the grouting material is constrained or loaded by the air pressure until it is fully set or changed from a fluid to a solid form. This prevents the grouting material from shrinking and assures its tight bond to the walls of the jacket and piling, so that no seepage of sea water can occur to corrode and deteriorate the composite strength of the grouted unit.

It may be noted that although the invention is primarily concerned with grouting of offshore structures of the type mentioned, the teachings of the invention are also applicable to grouting of similar structures in general, that is, not necessarily those which rest on the seabed.

What is claimed as new is:

1. A method of grouting an offshore structure having at least one supporting leg including a tubular jacket extending downwardly from above the waterline to the seabed and a piling driven through said jacket into the seabed with an annular space existing between the inside of the jacket and said piling; said method comprising the steps of a. sealing the upper end of said jacket to said piling so as to close said annular space at the upper end of the jacket;

b. introducing compressed air into said annular space at a point adjacent the upper end of the jacket and above the waterline so as to expel water from said space through the lower end of the jacket;

c. introducing fluid grouting material into said annular space at a point adjacent the upper end of the jacket and above the waterline after water has been expelled from said space as aforesaid;

d. simultaneously maintaining static air pressure in said annular space sufficient to prevent ingress of water through the lower end of said jacket while the grouting material is being introduced into said space; and e. permitting the grouting material to set.

*2. A method of grouting an offshore structure having at least one supporting leg including a tubular jacket extending downwardly from above the waterline to the seabed and a piling driven through said jacket into the seabed with an annular space existing between the inside of the jacket and said piling; said method comprising the steps of*

*a. sealing the upper end of said jacket to said piling so as to close said annular space at the upper end of the jacket;*

*b. introducing compressed air into said annular space so as to expel water from said space through the lower end of the jacket;*

*c. introducing fluid grouting material into said annular space at a point adjacent the upper end of the jacket after water has been expelled from said space as aforesaid; and*

*d. permitting the grouting material to set.*

*3. A method as defined by claim 2 and including*

*maintaining static air pressure in said annular space sufficient to prevent ingress of water through the lower end of said jacket while the grouting material is being introduced into said space.*

*4. A method as defined by claim 2 wherein an initial fill of grout is allowed to set before grouting the rest of the annular space,*

*5. A method as defined by claim 3 wherein an initial fill of grout is allowed to set before grouting the rest of the annular space.*

*6. A method as defined by claim 2 wherein the air is introduced at a point adjacent the upper end of the jacket.*

*7. A method of grouting an offshore structure having at least one supporting leg including a substantially vertically extending tubular jacket in the water and a piling in said jacket having an outside diameter smaller than the inside diameter of the jacket whereby a space is formed between the inside of the jacket and said piling; said method comprising the steps of*

*a. sealingly enclosing said space at its upper end;*

*b. introducing compressed gas into said space so as to expel water from said space through the lower end of the jacket;*

*c. introducing fluid grouting material into said space at a point adjacent its upper end after water has been expelled from said space as aforesaid; and*

*d. permitting the grouting material to set.*

*8. A method as defined by claim 7 wherein said tubular jacket extends downwardly at least to the seabed and said piling is driven into the seabed, whereby the lower end of said space is open to the seabed.*

*9. A method as defined by claim 7 and including*

*maintaining static air pressure in said space sufficient to prevent ingress of water through the lower end of said jacket while the grouting material is being introduced into said space.*

*10. A method as defined by claim 8 wherein an initial fill of grout is allower to set before grouting the rest of the space.*

*11. A method as defined by claim 8 wherein the gas is introduced at a point adjacent the upper end of the space.*

*12. A method of grouting an offshore structure having at least one supporting leg including a substantially vertically extending tubular jacket having its lower end in the seabed and a piling in said jacket driven into the seabed having an outside diameter smaller than the inside diameter of the jacket whereby a space is formed between the inside of the jacket and said piling; said method comprising the steps of*

*a. sealingly enclosing said space at its upper end;*

*b. introducing compressed gas into said space so as to expel water from said space through the lower end of the jacket into the seabed until all the water has been expelled from said space;*

*c. controlling the gas pressure to maintain a static gas pressure sufficient to prevent ingress of sea water through the lower end of the jacket;*

*d. introducing an initial fill of fluid grouting material into said space at a point adjacent its upper end while such gas pressure is being maintained;*

*e. permitting the initial fill of grouting material to set;*

*f. introducing sufficient additional grouting material to substantially fill said space; and*

*g. permitting the additional grouting material to set.*

*13. A method of grouting an offshore structure having at least one supporting leg including a substantially vertically extending tubular jacket in the water and a piling in said jacket having an outside diameter smaller than the inside diameter of the jacket whereby a space containing water is formed between the inside of the jacket and said piling; said method comprising the steps of*

*a. sealingly enclosing said space at its upper end;*

*b. introducing compressed gas into said space so as to expel the water from said space through the lower end of the jacket;*

*c. introducing fluid grouting material into said space at a point adjacent its upper end after substantially all of the water has been expelled from said space as aforesaid; and*

*d. permitting the grouting material to set.*

*14. A method as defined by claim 13 and including*

*maintaining static air pressure in said space sufficient*

*to prevent ingress of water through the lower end of said jacket while the grouting material is being introduced into said space.*

*15. A method as defined by claim 14 wherein an initial fill of grout is allowed to set before grouting the rest of the space.*

References Cited

The following references, cited by the Examiner, are of record in the patented file of this patent or the original patent.

UNITED STATES PATENTS

| | | | |
|---|---|---|---|
| 3,209,544 | 10/1965 | Borrmann | 61—46.5 |
| 3,492,824 | 2/1970 | Evans et al. | 61—46.5 |
| 3,564,856 | 2/1971 | Blount et al. | 61—46 |
| 3,597,930 | 8/1971 | Rochelle | 61—46 |
| 3,187,513 | 6/1965 | Guild | 61—53.6 X |

JACOB SHAPIRO, Primary Examiner

U.S. Cl. X.R.

61—53.52, 53.6, 54